United States Patent [19]
Yamada

[11] 3,765,759
[45] Oct. 16, 1973

[54] READER PRINTER
[75] Inventor: Hiroshi Yamada, Ichikawa, Japan
[73] Assignee: Ricoh Co., Ltd., Tokyo, Japan
[22] Filed: May 1, 1972
[21] Appl. No.: 249,029

[30] Foreign Application Priority Data
May 6, 1971 Japan.................................. 46/30039

[52] U.S. Cl......................... 355/45, 355/27, 355/65
[51] Int. Cl. .......................................... G03b 13/28
[58] Field of Search ...................... 355/5, 45, 64, 65

[56] References Cited
UNITED STATES PATENTS
3,619,052  11/1971  Diachuk et al. ...................... 355/45
3,442,586  5/1969  Coil et al. ............................. 355/45

Primary Examiner—Samuel S. Matthews
Assistant Examiner—Richard A. Wintercorn
Attorney—Robert S. Dunham et al.

[57] ABSTRACT

An apparatus comprising a projection lens, a first reflector and a second reflector wherein a frame of desired information of a microfilm or microfiche placed on a predetermined projection position in the apparatus, has its picture projected through the projection lens and first and second reflectors on a screen of the light transmission type to form an enlarged image of the information on it which can be observed from outside the apparatus. When it is desired to make a duplicate of the information on an enlarged scale, the second reflector is withdrawn from the path of light projection and an optical image of the information is transmitted through the projection lens and first reflector to the surface of an electrophotographic photosensitive sheet electrically charged uniformly beforehand to form an electrostatic latent image which is then developed into a visible image to provide a duplicate of the information.

9 Claims, 16 Drawing Figures

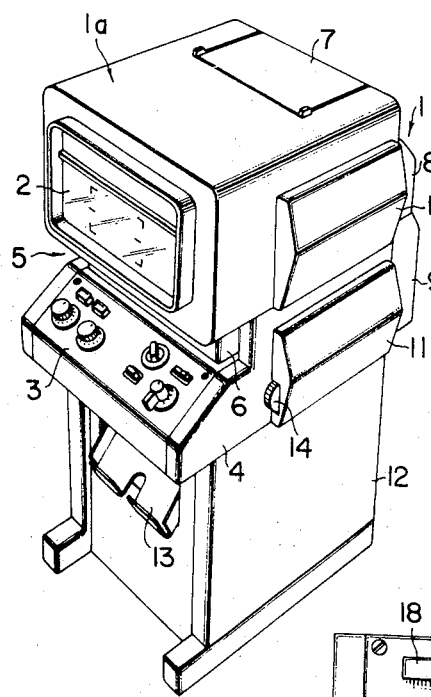
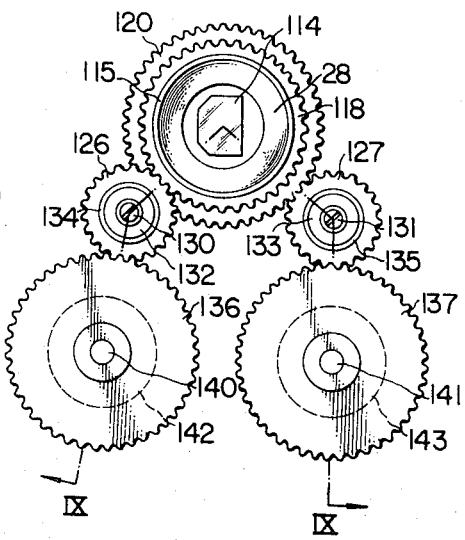
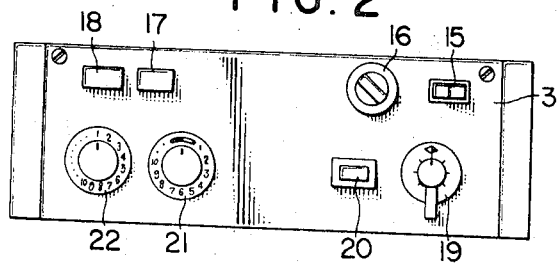
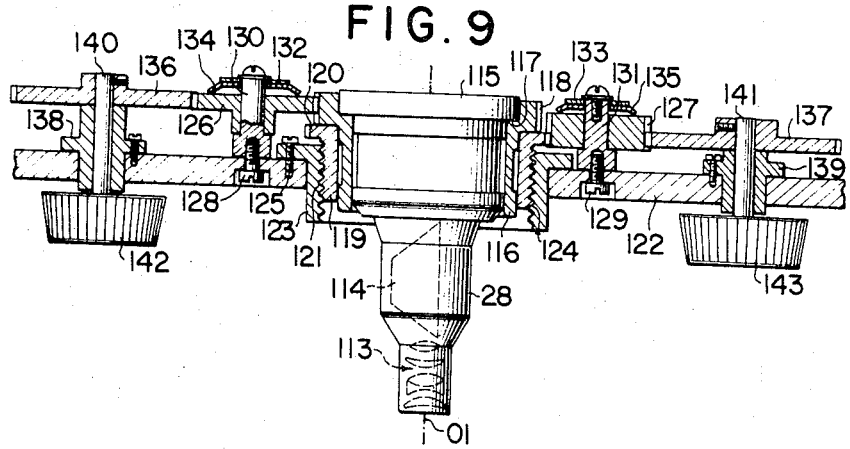

READER PRINTER

BACKGROUND OF THE INVENTION

This invention relates to what are generally referred to as reader printers which project a picture of information on a screen for observation and which make a duplicate of the information when desired.

Reader printers permit any frame as desired of a microfilm or microfiche carrying information on a reduced scale to be projected on a screen on an enlarged scale for observation and also make, when required, a duplicate for the information on an enlarged scale.

In one type of reader printer known in the art, which is referred to as a light transmission type, a picture of the desired information is projected on a screen made of a vitreous material formed therein with a mat surface or a vitreous material which is semitransparent itself for direct observation. In this type machine, two reflectors are employed to obtain formation of an erect image on the screen, and duplication of an erect image on a photosensitive sheet is achieved by switching the path of light between the projection operation and exposure operation through moving one of the reflectors. The projection lens is arranged in a position in a lower portion of the machine so that the information recording medium, such for example as microfilm or microfiche, can be manipulated in a position which permits ready access to it.

It is required in this type of reader printers when moving one of the reflectors out of the path of light to change the direction of light in order to expose a photosensitive sheet to an optical image of the picture carrying desired information, that the screen be shielded from light during the exposure operation to keep fog from being produced on the photosensitive sheet by the light leaked through the screen.

It is also essential in moving one of the reflectors out of the path of light that means be provided to preclude damage to the projection lens and its optical system during movement and not to interfere with the path of light. This end may be attained by moving the reflector to a side opposite to the projection lens and its optical system with respect to the path of light and shielding the screen by another light intercepting plate. In such case, however, the reflector and the light intercepting plate will be required to be formed separately and independently. This will render support and operation devices more complex than would otherwise be the case and makes it impossible to obtain an overall compact size in a reader print.

SUMMARY OF THE INVENTION

The present invention provides a reader printer wherein one of the two reflectors is supported for pivotal motion by support means which is constructed such that movement of one reflector into and away from the path of light does not cause damage to the optical system of the projection lens and does not interfere with the path of light. This one reflector is moved upwardly of the projection lens to a rear side of the screen to function as a light intercepting plate for the screen when a photosensitive sheet is exposed to an optical image of a picture carrying desired information.

The reader printer according to this invention offers the advantage that it is possible to switch the apparatus between the projection operation and the duplicate making operation by merely moving one of the reflectors into or away from the path of light, said one reflector serving as a light intercepting plate for the screen when a duplicate making operation is being performed. This permits the apparatus to be simplified and affords enough room for other devices without damaging the optical system of the projection lens or interfering with the path of light.

The printer section of the reader printer according to this invention may consist of a copier of the electrophotographic type. A photosensitive sheet of suitable material may be employed and supply means may be incorporated, which uses a web of photosensitive material in roll form or a stack of photosensitive sheets already cut at a desired size for supplying photosensitive sheets one after another for duplication.

It has been found, however, that by incorporating a copier of the wet developing electrophotographic type in the apparatus as the printer section, it is possible to provide a duplicate of high quality with a well-defined and clear image formed thereon quickly and at low cost.

Another feature of the invention is the provision of a reader printer wherein an operation panel is provided below the screen to facilitate operation of the apparatus, so that a completed duplicate can be discharged from the apparatus at the operator's side.

A further object of the invention is to provide a reader printer wherein various devices are arranged most reasonably and can operate most efficiently in co-operation with one another, and the apparatus as a whole is compact in size.

These and other objects of the invention are pointed out in the following description in terms of the embodiment thereof which is shown in the accompanying drawings.

BRIEF DESCRIPTION OF THE DRAWINGS

FIG. 1 is a perspective view of the reader printer comprising a preferred embodiment of this invention;

FIG. 2 is a plan view of the operation panel of the reader printer shown in FIG. 1;

FIG. 8 is a plan view of the projection lens bodytube operating mechanism of the reader printer according to this invention;

FIG. 9 is a developed sectional view of the projection lens bodytube operating mechanism taken along the line IX—IX of FIG. 8;

DESCRIPTION OF A PREFERRED EMBODIMENT

Figure 3:
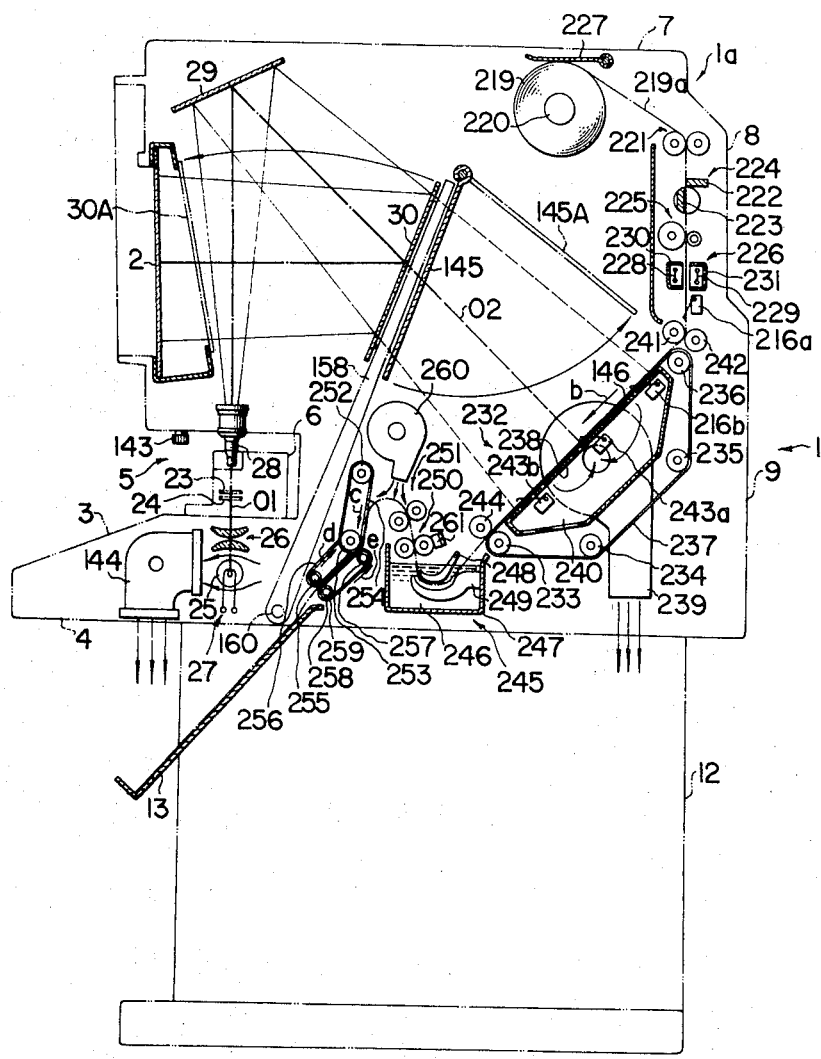
FIG. 3 is a sectional view of the reader printer shown in FIG. 1 showing its internal mechanism.

In FIG. 1, there is shown a reader printer generally designated 1 comprising one embodiment of this invention. This reader printer has a printer section incorporating an electrophotographic copier of the wet developing type which uses a roll of photosensitive strip formed on its surface with a photoelectric material layer as by applying a coat of zinc oxide. The invention will now be described in some detail with reference to the embodiment.

In FIG. 1, reader printer 1 includes a screen 2 mounted at a front side of an upper portion of a casing 1a, housing therein the reader printer which is substantially square in shape. Disposed below screen 2 is a forwardly projecting shelf section 4 formed on its upper surface with an operation panel 3 slightly inclined forwardly.

Formed between shelf section 4 and screen 2 is a recess 5 which is adapted to selectively receive therein microfilm feed means 6 shown in FIG. 5 or microfiche holding means 66 shown in FIG. 7 which will subsequently be described.

A lid 7 which is removed when a roll of photosensitive material is to be replenished is provided in an upper rear portion of casing 1a of reader printer 1. Lids 8 and 9 are provided on a rear portion and lids 10 and 11 are provided at opposite sides of casing 1a of reader printer 1 which lids are removed when access is had to the interior of the reader printer for inspection, maintenance and repair. The lids at the left side are not shown.

Reader printer 1 rests on a support box 12 which is adapted to house various attachments and contain supplies therein. A suplicate tray 13 is detachably attached to a portion of support box 12 which is disposed below shelf section 4. A condenser focusing adjusting ring 14 is mounted in a front portion of lid 11 at the right side of reader printer 1.

As shown in FIG. 2 a main switch button 15, a photosensitive sheet size setting knob 16, a photosensitive sheet amount indication window 17, a developing liquid quantity indication window 18, a microfilm feed control knob 19, a printing instruction button 20, an exposure control knob 21, and a duplicate number setting dial 22 are provided on operation panel 3. Turning of photosensitive sheet size setting knob 16 counter clockwise in the figure permits duplicates to be obtained in full-size sheets, while turning thereof clockwise permits duplicates to be obtained in half-size sheets. The operation panel 3 shown and described is intended solely for microfilm and can be replaced by an operation panel for microfiche.

Microfilm feed control knob 19 is adapted to control microfilm feed means 6 when the latter is mounted in recess 5 shown in FIG. 1. If knob 19 is turned counter clockwise in FIG. 2, the microfilm will be moved in a normal direction and wound; if it is turned clockwise, the microfilm will be moved in a reverse direction and rewound. By varying the angle through which knob 19 is turned, it is possible to vary the rate at which the microfilm is fed.

The microfilm feed means 6 is mounted in recess 5 as shown in FIG. 3, comprises an upper gate plate 23 and a lower gate plate 24 made as of transparent glass which is adapted to hold therebetween any frame of the microfilm as desired after the microfilm is fed and moved back and forth to locate the desired frame. Light source means 27 consisting of a lamp 25 and a condenser lens 26 is mounted in shelf section 4 and disposed below the two gate plates 23 and 24. A bodytube 28 having a built-in projection lens assembly subsequently to be described is mounted above the two gate plates 23 and 24. Light source means 27 and body-tube 28 are disposed in optical relation with the projection lens. Microfilm feed means 6 is brought to the projection position by aligning the two gate plates 23 and 24 with the optical axis 01 of condenser lens 26 and the projection lens assembly.

The optical axis 01 of condenser lens 26 and projection lens assembly extends upwardly in FIG. 3 in which a first reflector 29 is shown as being arranged in reader printer 1 near its left upper corner. First reflector 29 is inclined so as to reflect rearwardly downwardly of the casing 1a, the light incident thereon along the optical axis 01 from the projection lens assembly. Disposed in the path of light reflected by first reflector 29 is a second reflector 30, also inclined, so as to reflect forwardly of the casing 1a the light from first reflector 29. The light reflected by second reflector 30 is thrown onto screen 2 and the projected picture forms an image thereon. Thus, the information recorded on a reduced scale on microfilm is shown on the screen on an enlarged scale.

Figure 4:
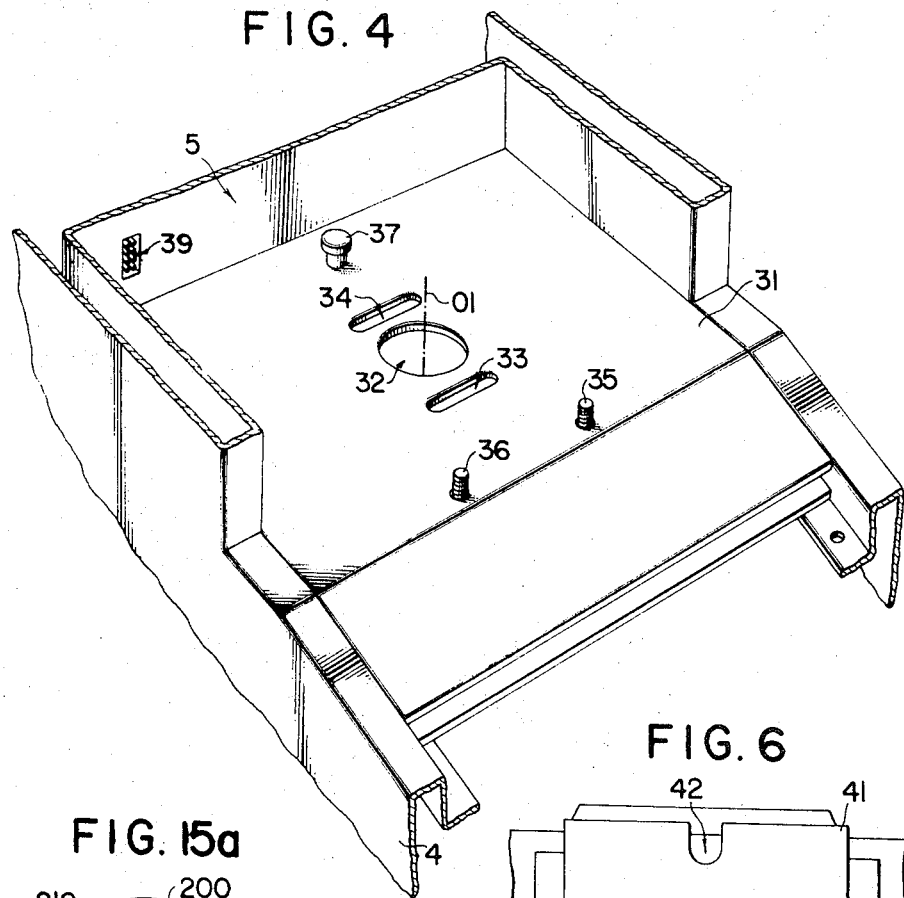
FIG. 4 is a perspective view of the top plate of the shelf portion of the reader printer according to this invention permitting either micrifilm feed means or microfiche holding means to be selectively mounted thereon.

In FIG. 4, shelf section 4 is shown to include a top plate 31 constituting the bottom of recess 5 which is formed therein with a circular opening 32 for permitting therethrough the light moving along the optical axis 01 of condenser lens 26 and projection lens assembly, and a pair of slots 33 and 34 for cooling air to pass therethrough which are disposed opposite each other with respect to circular opening 32. Two screws 35 and 36 are connected to a forward portion of top plate 31 by being threaded into the plate from its underside. A headed pin 37 is attached to a rearward portion of top plate 31, and a jack 39 for providing connection to a plug 38 shown in FIG. 5 for microfilm feed means 6 is provided on a leftward portion of a rear wall for controlling feeding of microfilm.

Figure 6:
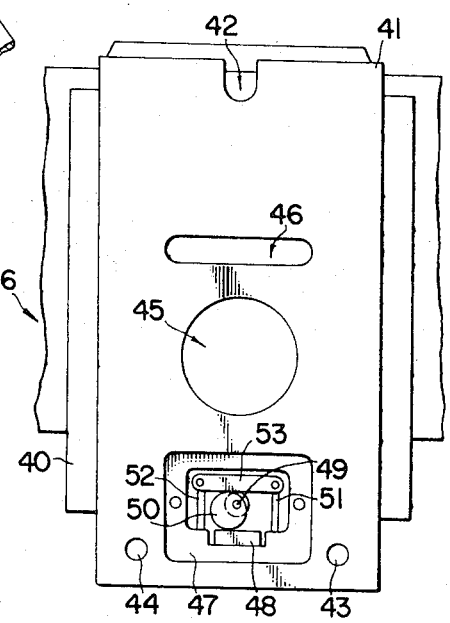
FIG. 6 is a bottom plan view of the bottom plate of the micrifilm feed means showing its construction.
Figure 5:
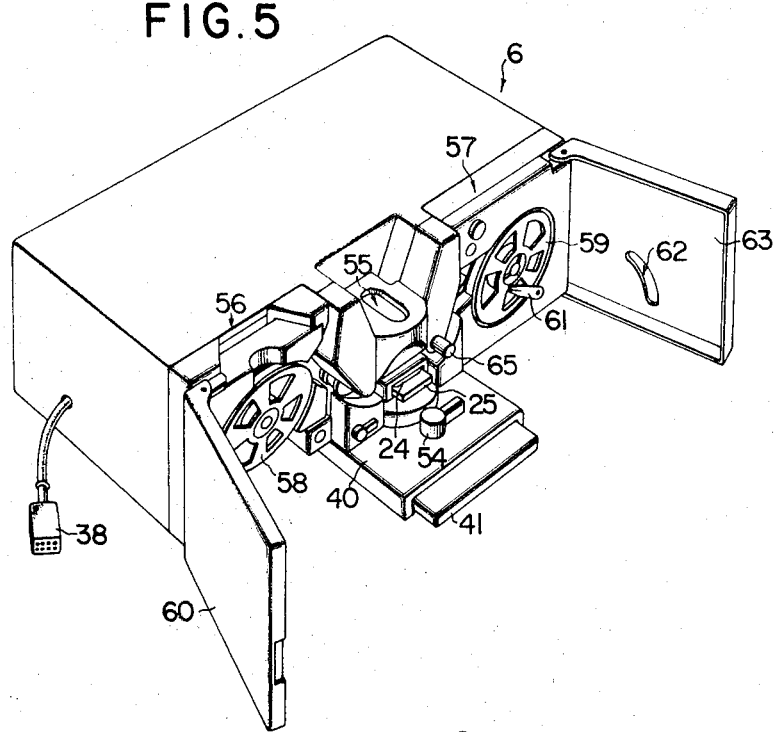
FIG. 5 is a perspective view of the microfilm feed means.

As seen in FIG. 5 microfilm feed means 6 has a bottom plate 40 which is slidable relative to a support plate 41 shown in FIG. 6, so that means 6 is mounted for free movement back and forth relative to support plate 41. Formed in support plate 41 are a cutout 42 adapted to engage the headed pin 37 shown in FIG. 4, threaded openings 43 and 44 threadably receiving therein the screws 35 and 36, a circular opening 45 aligned with circular opening 32 and a slot 46 aligned with slot 34.

In mounting microfilm feed means 6 in recess 5, cutout 42 is brought into engagement with headed pin 37 and screws 35 and 36 are threadably connected to threaded openings 43 and 44 respectively after plug 38 is connected to jack 39. Thus support plate 41 is first firmly secured to top plate 31. Support plate 41 is formed therein as shown in FIG. 6 with a framed portion 47 having a cam receiver 48 secured to one end edge thereof. Maintained in engagement with cam receiver 47 is a discal eccentric cam 50 which is supported by a shaft 49 connected to bottom plate 40. A presser 53 mounted on threaded rods 51 and 52 connected to framed portion 47 presses against eccentric cam 50 from a side opposite cam receiver 48 with respect to the cam. Preferably, presser 53 is made of nylon or other material. However, it may be made of metal.

Secured to an end portion of shaft 49 projecting outwardly of bottom plate 40 is a projection position adjusting knob 54 (FIG. 5) which serves the purpose of bringing microfilm feed means 6 to the projection position.

Movement of bottom plate 40 relative to support plate 41 can be obtained by turning knob 54 to achieve in support plate 41 are a cutout 42 adapted to engage the headed pin 37 shown in FIG. 4, threaded openings 43 and 44 threadably receiving therein the screws 35 and 36, a circular opening 45 aligned with circular opening 32 and a slot 46 aligned with slot 34.

In mounting microfilm feed means 6 in recess 5, cutout 42 is brought into engagement with headed pin 37 and screws 35 and 36 are threadably connected to threaded openings 43 and 44 respectively after plug 38 is connected to jack 39. Thus, support plate 41 is first firmly secured to top plate 31. Support plate 41 is formed therein as shown in FIG. 6 with a framed portion 47 having a cam receiver 48 secured to one end edge thereof. Maintained in engagement with cam receiver 47 is a discal eccentric cam 50 which is supported by a shaft 49 connected to bottom plate 40. A presser 53 mounted on threaded rods 51 and 52 connected to framed portion 47 presses against eccentric cam 50 from a side opposite cam receiver 48 with respect to the cam. Preferably, presser 53 is made of nylon or other material. However, it may be made of metal.

Secured to an end portion of shaft 49 projecting outwardly of bottom plate 40 is a projection position adjusting knob 54, (FIG. 5) which serves the purpose of bringing microfilm feed means 6 to the projection position.

Movement of bottom plate 40 relative to support plate 41 can be obtained by turning knob 54 to achieve fine adjustments of the relative positions of the two plates 40 and 41. As a result, microfilm feed means 6 moves as a whole back and forth in sliding motion, thereby permitting a frame of microfilm carrying desired information to be placed in the projection position by moving the microfilm.

Referring again to FIG. 5, aforementioned gate plates 23, 24 are shown fitted in a middle portion of the front side of microfilm feed means 6. A slot 55, permitting light to pass therethrough, is aligned with circular openings 32 and 45 formed in top plate 31 (shown in FIG. 4) and support plate 41 respectively. Microfilm feed means 6 can be brought to the projection position by operating projection position adjusting knob 54 to move microfilm feed means 6 as a whole so as to place gate plates 23, 24 on the optical axis 01 of condenser lens 26 and projection lens. Microfilm feed means 6 is also provided in left and right front portions thereof with a microfilm feed section 56 and microfilm take-up section 57 which house therein a microfilm supply reel 58 and a microfilm take-up reel 59 respectively. Reels 58 and 59 are adapted to be driven by a drive mechanism provided in microfilm feed means 6 for moving the microfilm in the normal and reverse directions to bring a desired frame into alignment with gate plates 23, 24.

An open reel or a film cartridge can be selectively mounted in microfilm supply section 56 which is provided with a door 60 that is closed after a film is mounted on the reel. In microfilm take-up section 57, provided with the film take-up reel 59, the amount of film wound on reel 59 is indicated by a pointer 61. This section 57 is provided with a door 63 having therein a window 62 of the arcuate slot shape which mounts therein a transparent plate. When door 63 is closed, pointer 61 can be seen through window 62.

The microfilm mounted on supply reel 58 can be moved both in the normal and reverse directions by manipulating microfilm feed control knob 19 shown in FIG. 2 so as to detect and bring a desired frame to the projection position. Provided at a right side of microfilm feed means 6 in the vicinity of gate plates 23, 24 is a feed knob 65 which permits feed of microfilm to be performed manually to facilitate precise moving of the microfilm back and forth to detect a desired frame.

Microfilm feed means 6 is constructed as aforementioned. Automatic frame detection means may be connected, if desired to feed means 6.

Microfiche holding means 66 which can be mounted in recess 5 in place of microfilm feed means 6 will now be described with reference to FIG. 7. In the figure, a support plate 67 is shown as being formed therein with a rear edge cutout 68, threaded opening 69, 70 near its front edge, central opening 71 and a slot 72 each respectively corresponding to the cutout 42, threaded openings 43, 44 and opening 45 and slot 46 formed in the support plate 41 of microfilm feed means 6 as shown in FIG. 6. Support plate 67 is also formed therein with a slot 73 corresponding to the slot 33 formed in top plate 31 as shown in FIG. 4. Slots 72 and 73 are covered with shields 74 and 75 respectively for preventing leakage of light.

Microfiche holding means 66 can be secured in place on top plate 31 by bringing the cutout 68 formed in support plate 67 into engagement with headed pin 37 shown in FIG. 4 and bringing screws 35 and 36 into threadable engagement in threaded openings 69 and 70 respectively. Support plate 67 has two side walls 76 and 77 each formed on rearward portions of inner surfaces thereof with a rectangular recess 78 (such recess of side wall 77 only is shown). A rail 79 is arranged horizontally on a lower portion of each rectangular recess 78. A roller 81 is secured to each of opposite ends of a movable shaft 80 rides on rail 79. A gear 82 is secured to each of opposite ends of movable shaft 80 to be disposed outwardly of the respective roller 81, with such gear being maintained in meshing engagement with a rack 83 arranged horizontally on an upper portion of each rectangular recess 78. Being supported as aforementioned, movable shaft 80 can move between side walls 76, 77 in a horizontal plane in a direction normal to the shaft without tilting.

A base plate support frame 85 having a transparent microfiche holding base plate 84 secured to its upper surface is slidably mounted on movable shaft 80 by loosely fitting on movable shaft 80 mounting portions 86, 87 attached to opposite ends of a rear side of the frame. Thus, frame 85 is movable in sliding motion along movable shaft 80.

Base plate support frame 85 has depending portions 88 and 89 at opposite sides thereof. A slot 90 is formed in each of depending portions 88 an 89 (such slot of slot 88 only is shown) for loosely receiving therein a fixed shaft 91 firmly secured to opposite side walls 76 and 77 so as to slidably support a front portion of base plate support frame 85. It is to be understood that other support means than the one described above, such means as supporting the base plate support frame merely on a fixed shaft, for example, may be used in this invention.

A transparent presser plate 92 corresponding to transparent base plate 84 is secured to the underside of a presser plate support frame 93 which has attached to opposite sides of a rear portion thereof mounting portions 94, 95 which are loosely fitted over tubular portions (not shown) of the mounting portions 86, 87 of base plate support frame 85. Thus presser plate support frame 93 is secured to base plate support 85 for movement between an upright position and a lying position. A microfiche sheet is held between the two plates 84 and 92, with the position of the microfiche sheet being determined by positioning members 96, 97 normally tending to move upwardly.

Stiffening plates 98, 99 are provided at opposite sides of the rear portion of presser plate support frame 93 for engagement with the mounting portions 86, 87 of base plate support frame 85 to prevent presser plate support frame 93 from becoming wobbly. Any other means than the means shown and described may be used for supporting the presser plate support frame on the base plate support frame for movement between an upright position and a lying position. For example, the presser plate support frame may be directly connected to the base plate support frame for movement between the aforementioned positions.

A metallic support fixture 100 is firmly secured to the right portion of the front side of base plate support frame 85 and includes arms 101, 102 projecting forwardly and mounting therebetween a shaft 104 supporting an indicator supporter 103. A transparent holddown plate 105 is mounted on shaft 104 for movement between an upright position and a lying position with respect to indicator supporter 103. An indicator for moving the microfiche sheet back and forth for detecting a desired frame is mounted between supporter 103 and hold-down plate 105.

An arm 108 extending above indicator supporter 103 projects from the right end of the front side of base plate support frame 85 and has a handle 109 secured to its front portion. Inserted in handle 109 is an indication pin 110 which bears at its front end on indicator hold-down plate 105 by its own weight. Indication pin 110 can move in and out of handle 109 while sliding on an inclined surface of hold-down plate 105 as handle 109 is moved along the inclined surface. Dislodging of indication pin 110 is precluded by suitable means.

In projecting a picture of desired information on the screen, handle 109 is operated to trace the indicator with indication pin 110 so as to move and bring the desired frame of the microfiche sheet into index with the optical axis $O_1$. Movement of the microfiche sheet along its columns can be obtained by axially moving base plate support frame 85 in sliding motion along shafts 80, 91, while movement thereof along its rows can be obtained by moving shaft 80 in a direction normal to its axis along rails 79. In this movement shaft 80 rotates in a direction opposite the rotation in normal cases because of the meshing engagement of gears 82 at opposite ends of shaft 80 with racks 83 disposed above rails 79. Thus, friction of a suitable degree is produced between rails 79 and rollers 81 and precludes movement of base plate support frame 85 by the force of inertia.

Presser plate support frame 93 has depending fins 111, 112 at opposite sides thereof. If base support frame 85 is pulled greatly toward fixed shaft 91 and the two plates 84, 92 are moved out of the range of movement of the microfiche sheet for detection of a desired frame, then depending fins 111, 112 ride up on fixed shaft 91. This moves presser plate support frame 93 and presser plate 92 away from base plate support frame 85 into the upright position, thereby permitting a microfiche sheet to be taken out or mounted.

The foregoing description refers to a preferred embodiment of microfilm feed means 6 and a preferred embodoment of microfilm feed means 6 and preferred embodiment of microfiche holding means 66 to be used with the reader printer 1 according to this invention. It is to be understood, however, that any other means can take the place of means 6 and 66. The picture of a frame carrying desired information on a reduced scale placed in the projection position by either microfilm feed mean 6 or microfiche holding means 66 is projected through the projection lens assembly in bodytube 28 shown in FIG. 3 and first and first and second reflectors 29 and 30 on to screen 2 on an enlarged scale.

Now the projection lens assembly will be described. In FIGS. 8 and 9 the projection lens assembly is shown comprising a projection lens 113 and a trapezoidal prism 114 built in bodytube 28. Focusing of the projection lens assembly can be obtained by moving bodytube 28 vertically along the optical axis $O_1$ while rotation of the projected picture can be obtained by rotating bodytube 28 about the optical axis $O_1$.

Bodytube 28 is formed at its upper end with a flange 115 which rests on an offset portion 117 formed in a rotation cylinder 116 so that bodytube 28 may be loosely received in rotation cylinder 116. Rotation cylinder 116 which is formed with a serration 118 on an outer circumferential surface of an upper end portion thereof rests at its upper end portion on a threaded tube 119 which is formed with a serration 120 on an outer circumferential surface of an upper end portion thereof so that rotation cylinder 116 may be loosely received in threaded cylinder 119. Formed on an outer circumferential surface of threaded cylinder 119 is a threaded portion 121 which is maintained in threadable engagement with a threaded portion 124 formed on an inner circumferential surface of a receiving cylinder 123 supported by an immovable support plate 122. Receiving cylinder 123 is secured to support plate 122 by screws 125.

A gear 126 is maintained in meshing engagement with the serration 118 of rotation cylinder 116 while another gear 127 is maintained in meshing engagement with the serration 120 of threaded cylinder 119. Gears 126 and 127 are loosely supported by shafts 130 and 131 secured to support plate 122 by screws 128 and 129 respectively. Plate springs 134 and 135 supported by washers 132 and 133 are mounted on shafts 130 and 131 respectively so as to apply, to some degree, a brake to gears 127 and 127.

Gears 126 and 127 are also maintained in meshing engagement with gears 136 and 137 respectively. Gears 136 and 137 are secured to one of the ends of shafts 140 and 141 which are loosely supported by support plate 122 through bearings 138 and 139 respectively. A bodytube rotating knob 142 is attached to the opposite end of shaft 140 from gear 136, while a bodytube vertically moving knob 143 is attached to the opposite end of shaft 141 from gear 137. Thus by knobs 142 and 143 manually, it is possible to effect focusing and rotation of a projected image.

Figure 7:
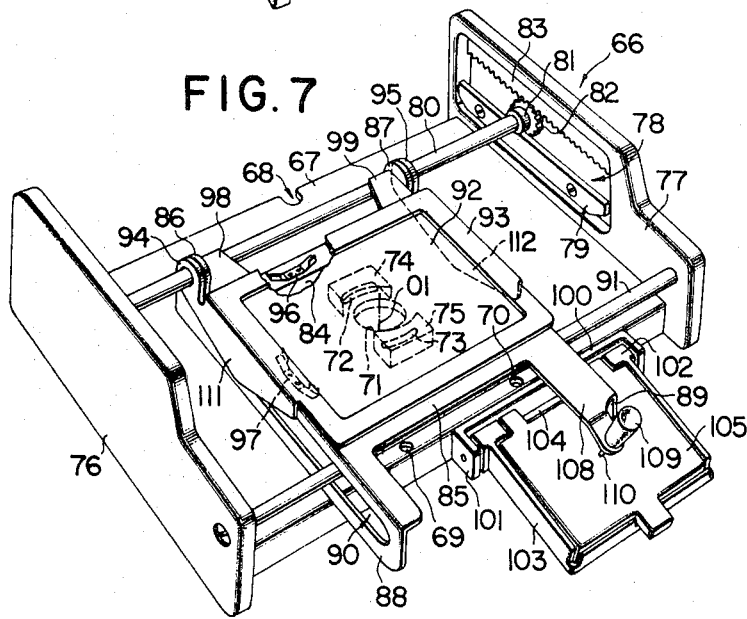
FIG. 7 is a perspective view of the microfiche holding means.

Referring to FIG. 3 again, a blower 144 is mounted forwardy of light source lamp 25 to effect drawing of air by suction through a cooling air passageway formed by the indexing of the slots 33 and 34 formed in top plate 31 with the slot 46 formed in microfilm feed means 6 as shown in FIG. 6 or the slots 72 and 73 formed in microfiche holding means 66 as shown in FIG. 7. This is effective to preclude overheating of parts in the vicinity of lamp 25 by the heat produced thereby.

Lamp 25 is adapted to be lit when the main switch is closed to emit light of a predetermined amount when projection of information is carried out. However, when a duplicate of information is to be made, lamp 25 is connected, after printing instruction button 20 is depressed, to a resistance circuit, in conjunction with movement of second reflector 30, which undergoes changes as exposure control knob 21 is turned, so that lamp 25 emits light of a proper quantity. The stream of cooling air produced by blower 144 is conducted to duplicate tray 13, thereby contributing to early drying of duplicates made.

The construction of the printer section of reader printer 1 according to this invention will now be described. In FIG. 3, second reflector 30 is disposed in the path of light reflected by first reflector 29, and a light intercepting plate 145 is mounted rearwardly of second reflector 30 to provide shielding for the leakage of light. Formation of a path of exposure light $0_2$ can be obtained by moving second reflector 30 and light intercepting plate 145 away from the plate of light reflected by first reflector 29. That is, an electrophotographic photosensitive sheet 146 disposed in an exposure position is exposed to an optical image of the information carried by a frame by permitting the light emanating from the projection lens assembly to move straight ahead after being reflected by first reflector 29.

Figure 10:
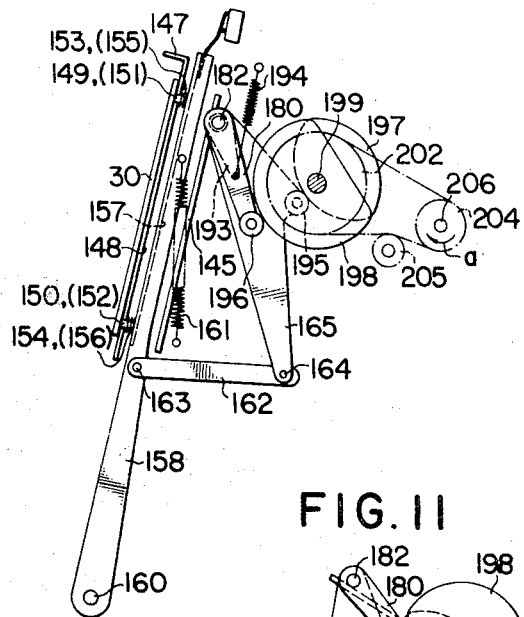
FIG. 10 is a side view of the second reflector and the light intercepting plate operating mechanism of the reader printer according to this invention.
Figure 14:
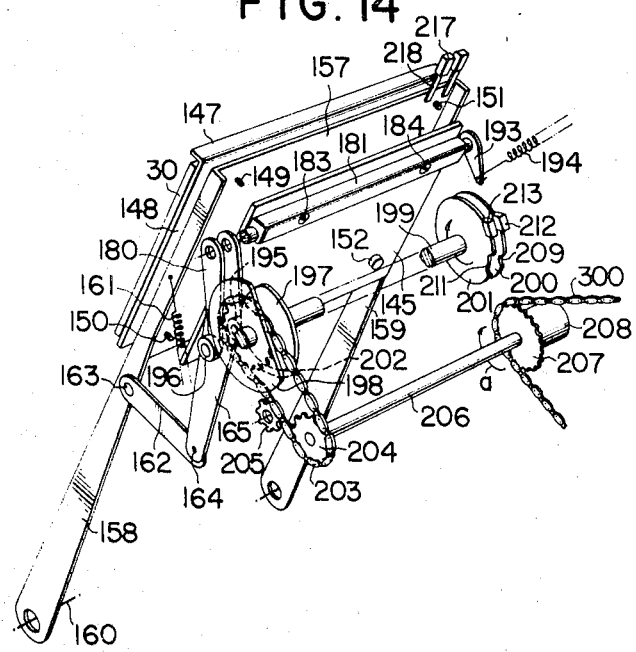
FIG. 14 is a perspective view of the second reflector and the light intercepting plate support and operating mechanisms.

As shown in FIG. 14, second reflector 30 is secured to a plate 148 having a forwardly bent upper marginal portion 147 supported by a support plate 157 through four shafts 149, 150, 151 and 152 connected to four corners of plate 148 and mounting springs 153, 154, 155 and 156 shown in FIG. 10 mounted on the aforementioned shafts 149, 150, 151 and 152 respectively.

Support plate 157 has rearwardly bent side marginal portions at both sides which extend downwardly to constitute support arms 158 and 159 as shown in FIG. 14. Support arms 158 and 159 are supported for pivotal motion at their bases by a shart 160 disposed near to and rearwardly of lamp 25 as shown in FIG. 3 and normally urged by the biasing force of a spring 161 to pivot clockwise about shaft 160 in FIG. 10. When second reflector 30 is in its operative or projection position shown in FIG. 3 in which it is operative to reflect toward screen 2 the light reflected by first reflector 29, the angle at which the biasing force is exerted by spring 161 is reduced to such a degree that the biasing force is almost nil.

Figure 13:
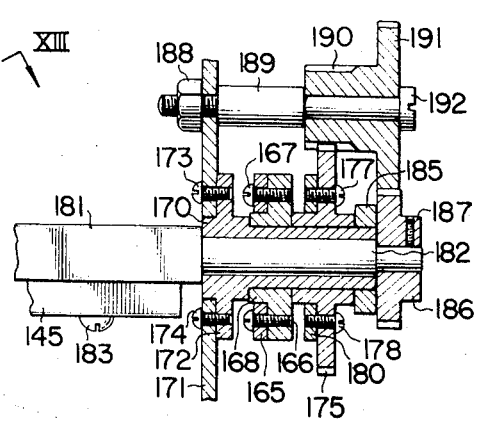
FIG. 13 is a developed sectional view of the gear section taken along the line XIII—XIII of FIG. 12.

Loosely connected to a middle portion of support arm 158 through a shaft 163 is a connection bar 162 which is connected through a shaft 164 to one end portion of a pivotal arm 165 which is connected at the other end portion to a tubular shaft 168 through screws 166, 167 as shown in FIG. 13. Tubular shaft 168 is loosely supported on a bearing 170 which is secured to an immovable member or wall 171 by connecting a flange 172 thereof to wall 171 by screws 173, 174.

Figure 12:
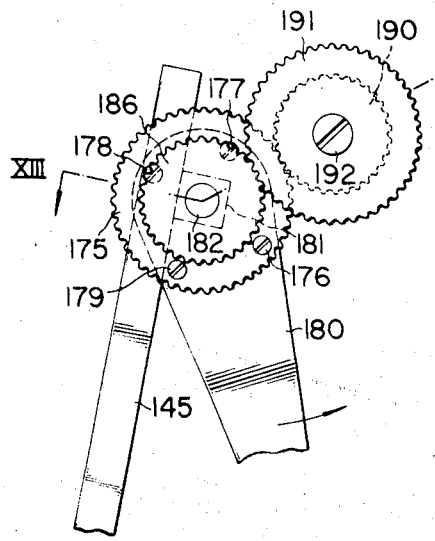
FIG. 12 is a side view of the gear section of the light intercepting plate operating mechanism.

Also, mounted on bearing 170 is a gear 175 having an arm 180 secured to one side thereof by screws 176, 177, 178 and 179 as shown in FIG. 12. Rotatably supported in bearing 170 is a round shaft portion 182 of a square shaft 181 to which the aforementioned shield 145 is secured by screws 183, 184 as shown in FIG. 14.

A washer 185 is mounted on bearing 170 to preclude the dislodging of gear 175 and tubular shaft 168. A gear 186 of relatively small diameter is secured to an outer end portion on portion 182 of square shaft 181 by a screw 187. Maintained in meshing engagement with gears 175 and 186 are gears 190 and 191, respectively, which are substantially integral with each other and rotatably mounted on a shaft 189 secured to wall 171 through a nut 188. A screw 192 is connected to shaft 189 to preclude dislodging of gears 190 and 191 therefrom.

The other end of square shaft 181 is supported by means similar to means supporting tubular shaft 168. A spring 194 is connected to one end of an arm 193 connected at the other end thereof to an outer end portion of square shaft 181 as shown in FIG. 14, so as to urge square shaft 181 to rotate counter clockwise in FIG. 10.

Pivotal arm 165 has a protuberance substantially in a center rear portion thereof to which a roller 195 is connected. Another roller 196 is connected to an end portion of arm 180. Rollers 195 and 196 are maintained in pressing engagement with cams 197 and 198 by the biasing forces of springs 161 and 194 respectively. Cams 197 and 198 are secured to a shaft 199 and remain stationary when second reflector 30 is in its operative position as shown in FIG. 10 with roller 195 being in a withdrawn position and roller 196 being in a projecting position.

Shaft 199, which is rotatably supported by an immovable member (not shown) in the machine, supports a first control cam 200 and a second control cam 201 at the end portion thereof opposite cams 197 and 198 and a sprocket wheel 202 at the same end portion thereof as cams 197 and 198 as shown in FIG. 14. Sprocket wheel 202 is connected to another sprocket wheel 204 by a chain 203 against which a tension wheel 205 is maintained in pressing engagement. Sprocket wheel 204 is supported by one end of a shaft 206 which is supported by the same immovable member which supports shaft 199. Shaft 206 mounts at the other end thereof a sprocket wheel 207 through an electromagnetic clutch 208. Sprocket wheel 207 is connected by a chain 209 to a drive source (not shown), and electromagnetic clutch 208 is operated at a suitable time after the printing instruction button is depressed to connect sprocket wheel 207 to shaft 206 to drive the same.

Figure 15A:
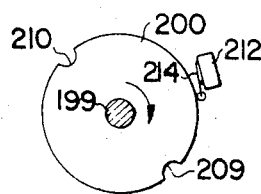
FIGS. 15a and 15b are a side view of the first and second cam wheels for controlling the operation of the second reflector and the light intercepting plate and the control switches associated with the cam wheels.
Figure 15B:
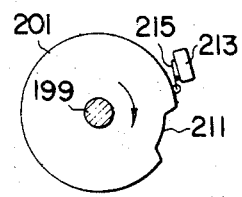

First control cam 200 is formed in its periphery with short cutouts 209 and 210 which are disposed at diametrically opposed positions with respect to shaft 199 as shown in FIG. 15a. Second control cam 201 is formed in its periphery with a rather long cutout 211 as shown in FIG. 15b. Short cutout 209 and long cutout 211 are axially aligned with each other. An actuator 214 for a normally open switch 212 is maintained in pressing engagement with the periphery of cam 200 while an actuator 215 for a normally closed switch 213 is maintained in pressing engagement with the periphery of cam 201; switches 212 and 213 being disposed in side-by side relation for controlling the electromagnetic clutch 208.

When electromagnetic clutch 208 is inoperative and second reflector 30 is in its operative position, actuators 214 and 215 are in engagement with cutouts 209 and 211 respectively, so that switches 212 and 213 are both open. Electromagnetic clutch 208 is connected to a control circuit consisting of switches 212 and 213, a sheet detection switch 216a or 216b shown in FIG. 3 and adapted to be actuated when a sheet moves, and a switch (not shown) connected to a timer. Instructions for operation produced by the control circuit upon depression of printing construction button 20 actuate electromagnetic clutch 208.

Chain 209 and sprocket wheel 207 are successively in operation after printing instruction button 20 is depressed. If electromagnetic clutch 208 is actuated to connect sprocket wheel 207 to shaft 206, than shaft 206 is driven to rotate in the direction of an arrow $a$ in FIG. 14. Rotation of shaft 206 in the direction of the arrow $a$ is transmitted through sprocket wheel 204, chain 203 and sprocket wheel 202 to shaft 199. Rotation of shaft 199 causes cams 200 and 201 to rotate. This first brings actuator 214 out of engagement with cutout 211, with the result the electromagnetic clutch 208 is maintained in the operative position and shaft 199 continues to rotate. One-half revolution of cams 200 and 201 brings the actuator 214 for switch 212 into engagement with cutout 210 to open switch 212, thereby rendering electromagnetic clutch 208 inoperative and interrupting rotation of shaft 199.

Figure 11:
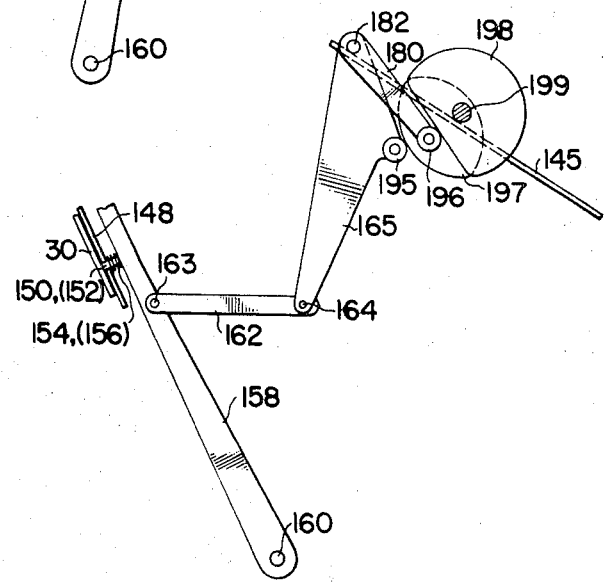
FIG. 11 is a side view of the second reflector and the light intercepting plate showing their manner of operation.

When shaft 199 has made one-half revolution from its initial position as shown in FIG. 11, the roller 195 of pivotal arm 165 is disposed in its frontmost position after being pushed by cam 197 while the roller 196 of arm 180 is maintained in engagement with a minimum diameter portion of cam 196 to move arm 180 to its rearmost position, thereby pushing and moving pivotal arm 165 forwardly.

Forward movement of pivotal arm 165 causes, through connection bar 162, the support arms 158, 159 for second reflector 30 to move forwardly, with the result that second reflector 30 moves to a dash-and-dot line position 30A shown in FIG. 3 in which it is disposed immediately rearwardly of screen 2 and completely shields the same. On the other hand, arm 180 begins to pivot rearwardly by following movement of cam 198 when second reflector 30 completely shields screen 2 as aforementioned. Pivotal movement of arm 180 is increased by a gear train comprising gears 175, 190, 191 and 186 and transmitted to shaft 181 as shown in FIG. 11, so that light intercepting plate 145 pivots rearwardly to a dash-and-dot position 145A shown in FIG. 3, thereby opening a path for exposure light $o_2$.

A normally open switch 217 for giving instructions for exposure is mounted at the back of an upper end of support plate 157 for second reflector 30 as shown in FIG. 14. Switch 217 has an actuator 218 which is released from engagement with support plate 157 upon movement of second reflector 30 to its exposure position. This causes lamp 25 to be connected to an exposure power supply circuit, thereby permitting exposure of the photosensitive sheet to an optical image of the desired information with a quantity of light which has been set by operating exposure control knob 21 shown in FIG. 2.

Following elapsing of a predetermined exposure time, lamp 25 is turned off by the action of timer and an instruction for operation is given to electromagnetic clutch 208. This brings electromagnetic clutch 208 into connection with sprocket 207 and shaft 206 again and causes shaft 199, whose rotation has been interrupted after it has made one-half revolution, to start rotating again. Rotation of shaft 199 releases the actuator 214 for normally open switch 212 from engagement with the cutout 210 of first control cam 200 and closes switch 212, thereby permitting electromagnetic clutch 208 to continue its operation.

Rotation of shaft 199 also causes cams 197 and 198, which have maintained second reflector 30 and light intercepting plate 145 in their exposure positions, to rotate again to restore reflector 30 and light intercepting plate 145 to their initial or projection positions shown in FIG. 10. The shape and configuration of cams 197 and 198 are set such that restoration of reflector 30 to its projection position precedes restoration of light intercepting plate 145 to its projection position.

Restoration of reflector 30 and light intercepting plate 145 to their projection positions causes first control cam 200 and second control cam 201 to return to their initial positions, with the result that the actuators 214 and 215 for switches 212 and 213 are brought into engagement with cutouts 209 and 211 respectively and switches 212 and 213 are opened. At this time, electromagnetic clutch 208 is rendered inoperative and shafts 206 and 199 stop rotating, thereby rendering all the elements related to the movement of second reflector 30 and shield 145 inoperative.

In FIG. 3, a roll of photosensitive strip 219 having a photoconductive material layer in its inner surface and rotatably supported by a shaft 220 is disposed rightwardly upwardly of reader printer 1 or inwardly of lid 7 shown in FIG. 1. A leading end portion 219a passes through a pair of photosensitive sheet feed rollers 221 to sheet cutting means 224 comprising a fixed cutter and a movable cutter 223.

The pair of photosensitive sheet feed rollers 221 make one complete revolution when printing instruction button 20 is depressed to give an instruction to start the feeding of photosensitive sheets. This causes leading end portion 219a to be fed to a pair of photosensitive sheet straightening and transporting rollers 225 which are adapted to rotate continuously upon depression of printing instruction button 20, so that leading end portion 219a is delivered to electrically charging means 226. When leading end portion 219a is nepped by rollers 225, feed rollers 221 merely rotate in slaved relation to movement of the photosensitive strip which is paid out successively from roll 219. A brake plate 227 supported at its base by a shaft connected to lid 7 is maintained lightly in engagement with roll 219 by its own weight. Brake 227 is effective to prevent excess photosensitive strip from being paid out from roll 219 by inertia. The aforementioned photosensitive sheet supply means may be replaced by means which supply photosensitive sheets cut to a predetermined size beforehand.

Electrically charging means 226 comprises chargers 230 and 231 having wire electrodes 228 and 229 respectively and juxtaposed to each other. Successive portions of the leading portion 219a of photosensitive strip passing between chargers 230 and 231 are electrically charged. The electrically charging means shown and described is of the so-called double charger type, but means of the single charger type may also be used. In some cases, a charger having a needle electrode may be used.

The leading end portion 219a of photosenstive strip moving forwardly after being electrically charged uniformly is delivered to photosensitive sheet transporting and positioning means 232 provided in a position in which the light moving along the path of exposure light $0_2$ forms an image.

Photosensitive sheet transporting and positioning means 232 comprises a plurality of perforated endless belts 237 entrained about belt rollers 233, 234, 235 and 236 to form a planar surface disposed normal to the path of exposure light $0_2$, and a suction box 240 disposed within the runs of endless belts 237 and formed with a multitude of suction openings 238 formed in a surface thereof which is exposed to the path of exposure light $0_2$, the suction box being connected to a suction pump 239 for drawing air by suction. Alignment of the openings formed in endless belts 237 with the suction openings 238 formed in suction box 240 permits a photosensitive sheet placed on the planar surface to be drawn by suction toward the surface and held in place.

Endless belts 237 continuously move in the direction of an arrow b following depression of printing instruction button 20. A plurality of hold-down rollers 231, 242 are maintained, through endless belts 237, in pressing engagement with the belt roller 236 disposed at the side from which leading end portion of photosensitive strip 219a is intorduced into the planar surface provided by endless belts 237. Leading end portion 219a is nipped by holddown roller 241 and endless belts 237 and moved over endless belts 237 while being drawn by suction toward the belts. Hold-down roller 242 rotates in a cirection opposite to the direction of rotation of hold-down roller 241 or opposite to the direction of movement of leading end portion 219a, thereby precluding deflection of leading end portion 219a from its predetermined path.

The aforesaid sheet detection switches 216a, 216b are disposed downstream of electrically charging means 226 and holddown roller 241 respectively and spaced apart from sheet cutting means 224 distances corresponding to a length of a halfsize sheet and a length of a full-size sheet respectively. On the other hand, stop switches 243a, 243b are mounted in a middle portion of the planar surface formed by endless belts 237 and in a terminal portion thereof respectively. Switches 216a and 243a are adapted to be actuated only when photosensitive sheet size setting knob 16 is set at a half-size while switches 216b and 243b are adapted to be actuated only when knob 16 is set at a full-size.

Assuming that photosensitive sheet size setting knob 16 is set at a half-size and printing instruction button 20 is depressed, an instruction to start operation will be issued to sheet cutting means 224 when leading end portion 219a of photosensitive strip depresses switch 216a so that leading end portion 219a will be cut to a length of a half-size sheet. At the same time, an instruction to start moving to the exposure positions will be issued to second reflector 30 and shield 145 so that movement of reflector 30 and shield 145 will be started. An electrically charged half-size sheet 146 produced by cutting leading end portion 219a will depress switch 243a disposed in the middle portion of the planar surface provided by endless belts 237 so that movement of belts 237 will be interrupted. Thus, sheet 146 will be positioned in a forward portion of the planar surface and exposed to an optical image of the desired information.

In case photosensitive sheet size setting knob 16 is set at a full-size, leading end portion 219a of photosensitive strip will be cut into a full-size sheet 148 when switch 216b is depressed. Full-size sheet 148 which is already electrically charged will be positioned on the planar surface provided by endless belts 237 when stop switch 243b is depressed and exposed to an optical image of the desired information.

A hold-down roller 244 is maintained, through endless belts 237, in pressing engagement with the belt roller 233 for endless belts 237 which is disposed on the photosensitive sheet discharge side. The photosensitive sheet 146 on which an electrostatic latent image is formed by exposure is delivered by hold-down roller 244 and endless belts 237 to developing means 245 disposed downstream thereof after remaining stationary on the planar surface for a time interval required for effecting exposure, the endless belts 237 being under the influence of the timer to start moving again after the aforementioned time interval has elapsed..

Developing means 245 comprises a developing liquid tank 247 containing therein a mixture of a toner and a developing liquid 246, a guide plate 248 and a number of rows of guide fins 249 disposed in the developing liquid tank in upper and lower portions thereof to define a photosensitive sheet passageway, and a pair of squeeze rollers 250 and a pair of blotter rollers 251 disposed downstream of developing liquid tank 247. The exposed photosensitive sheet 146 delivered by endless belts 237 and hold-down roller 244 is passed between guide plate 248 and guide fins 249 and moves through developing liquid tank 247 while being maintained in contact with the developing liquid therein, so that the electrostatic latent image on the sheet 146 is developed and converted into a visible image.

Mounted beyond the pair of blotter rollers 251 are a vertically arranged tape-like endless belt 254 entrained about belt rollers 252, 253 to move in the direction of an arrow c, an obliquely arranged tape-like endless belt 256 entrained about belt rollers 253, 255 to move in the direction of an arrow d, and an endless belt 259 entrained about belt rollers 257, 258 and disposed in sideby side relation with endless belt 256 to rotate in the direction of an arrow e. Disposed above the pair of blotter rollers 251 is a blower 260 adapted to dry the developed photosensitive sheet and change its direction of movement.

Developed photosensitive sheet 246 is dried after excess developing liquid is removed therefrom by the wiping of the rollers 251 and has its direction of movement changed by the air pressure to enter between endless belts 256 and 259 which transport the developed photosensitive sheet and discharge the same on duplicate tray 13. One of the pair of squeeze rollers 250 is a sponge roller while the other roller is made of metal with or without a coat of a non-metallic material applied to its surface. A cleaner 261 is maintained in pressing engagement with the squeeze rollers to remove therefrom the toner adhering thereto.

Developing means 245 and other means disposed downstream thereof are under the influence of the timer so that they continuously operate following depression of printing instruction button 20 till a duplicate of the information is placed on tray 13. In case duplicate number setting dial 22 is set at a plurality of duplicates, a required size and number of photosensitive sheets will be fed, electrically charged and exposed to an optical image of the desired information under the influence of a suitable counter. Developing means 245 and various means disposed downstream thereof will remain operative until a required number of duplicates are prepared.

The developing means 245 shown and described herein is a so-called wet type developing means. It is to be understood that, in place of this developing means, any known dry type developing means of the magnetic brush, hair brush or cascade type may be employed in this invention.

What I claim Is:

1. A reader printer comprising (a) a casing; (b) means mounted on and at the front of the casing for moving a transparency in a direction to place a required portion thereof in a projection position; (c) light source means disposed in the casing beneath the projection position for projecting an image of the required portion of the transparency for duplicating the information in the portion; (d) a projection lens assembly disposed in the casing above the projection position; (e) a first reflector disposed in the casing above the projection lens assembly and arranged to reflect the light emanating from the projection lens assembly to direct it to a lower rear portion of the casing; (f) a second reflector in the casing arranged to reflect the light reflected by the first reflector and direct it to a front portion of the casing; (g) a screen of the light transmission type disposed in an opening in the front portion of the casing and in a position in which the light reflected by the second reflector forms an image thereon; (h) second reflector support means including two spaced support arms pivotally disposed in the casing below the second reflector for supporting the second reflector at their upper ends and a shaft disposed in the lower portion of the casing rearwardly adjacent said light source means and supporting said support arms at their bases for pivoting astride said light source means; (i) means for operating the second reflector support means to pivot the second reflector from its operative position in which it is disposed in the path of light reflected by the first reflector to reflect the light and project the same on the screen to its inoperative position in which it is disposed adjacent to the screen to shield against light entering the casing; (j) photosensitive sheet transporting and positioning means disposed in the casing in a position in which the light reflected by the first reflector forms an image thereon when the second reflector is disposed in its inoperative position; (k) photosensitive sheet feed means for supplying photosensitive sheets to the photosensitive transporting and positioning means; and (l) developing means disposed downstream of the photosensitive sheet transporting and positioning means for developing the photosensitive sheets delivered thereby.

2. A reader printer as set forth in claim 1 wherein said transparency moving means is microfiche holding means comprising a transparent base plate and a transparent presser plate bearing on the base plate, said base plate and said presser plate being adapted to hold a microfiche sheet therebetween and movable so as to permit a desired frame of information to be detected and placed in the projection position.

3. A reader printer as set forth in claim 1 wherein the casing is formed in its front lower portion with a recess provided with a top plate having two screws connected to a forward portion thereof and a headed pin connected to a rearward portion thereof, and the transparency moving means comprises a microfilm feed means including a support plate formed therein with two threaded openings adapted to threadably receive said screws therein and a cutout adapted to engage said headed pin so as to faciliate mounting of the microfilm feed means in the recess of the casing.

4. A reader printer as set forth in claim 2 wherein the casing is formed in its front lower portion with a recess provided with a top plate having two screws connected to a forward portion thereof and a headed pin connected to a rearward portion thereof, and the microfiche holding means includes a support plate formed therein with threaded openings adapted to threadably receive said screws therein and a cutout adapted to engage said headed pin so as to facilitate mounting of the microfiche holding means in the recess of the casing.

5. A reader printer as set forth in claim 1 wherein the second reflector support means is under the influence of a spring connected thereto at an angle such that the angle at which the spring exerts its biasing force on the second reflector support means is reduced to such a degree that the biasing force is almost nil when the second reflector support means supports the second reflector in its projection position.

6. A reader printer as set forth in claim 1 wherein said means for operating the second reflector support means comprises a cam, a pivotal arm adapted to move in slaved relation to said cam, and a connecting bar connecting said pivotal arm to the second reflector support means.

7. A reader printer as set forth in claim 1 further comprising a light intercepting plate disposed adjacent to said second reflector in its operative position and adapted to be pivoted in the opposite direction therefrom in conjunction with the pivoting of the second reflector to its inoperative position and by the means for operating the second reflector support means.

8. A reader printer as set froth in claim 7 wherein said light intercepting plate is connected to the means for operating the second reflector support means through a gear train adapted to increase the pivotal movement of an arm.

9. a reader printer as set forth in claim 1 wherein an operation panel is provided beneath the screen, and a duplicate tray is provided beneath the operation panel.

* * * * *